United States Patent
Lin et al.

(10) Patent No.: US 11,282,272 B2
(45) Date of Patent: Mar. 22, 2022

(54) MODEL SIMPLIFICATION METHOD

(71) Applicant: GlenFly Technology Co., Ltd., Shanghai (CN)

(72) Inventors: Jianming Lin, Shanghai (CN); Xuan Zhao, Shanghai (CN); Yongyou Zhang, Shanghai (CN)

(73) Assignee: GlenFly Technology Co., Ltd., Shanghai (CN)

( * ) Notice: Subject to any disclaimer, the term of this patent is extended or adjusted under 35 U.S.C. 154(b) by 0 days.

(21) Appl. No.: 17/023,386

(22) Filed: Sep. 17, 2020

(65) Prior Publication Data

US 2022/0058864 A1    Feb. 24, 2022

(30) Foreign Application Priority Data

Aug. 24, 2020  (CN) .......................... 202010855118.8

(51) Int. Cl.
*G06T 17/10*    (2006.01)
*G06T 17/20*    (2006.01)

(52) U.S. Cl.
CPC .............. *G06T 17/10* (2013.01); *G06T 17/20* (2013.01); *G06T 17/205* (2013.01)

(58) Field of Classification Search
CPC ......... G06T 17/10; G06T 17/20; G06T 15/06; G06T 15/08; G06T 17/205
See application file for complete search history.

(56) References Cited

U.S. PATENT DOCUMENTS

| | | | | |
|---|---|---|---|---|
| 8,884,949 B1 * | 11/2014 | Lambert | ............ | G06K 9/00369 345/419 |
| 9,035,944 B2 * | 5/2015 | Werline | ................. | G06T 19/20 345/420 |
| 9,928,645 B2 * | 3/2018 | Chuang | ................... | G06T 17/20 |
| 2003/0103048 A1 * | 6/2003 | Kindratenko | ........... | G06T 15/40 345/421 |
| 2006/0250388 A1 * | 11/2006 | Anderson | ............... | G06T 19/20 345/419 |

OTHER PUBLICATIONS

Zhang, Eugene, and Greg Turk. "Visibility-guided simplification." IEEE Visualization, 2002. VIS 2002 . . . IEEE, 2002. (Year: 2002).*

(Continued)

*Primary Examiner* — King Y Poon
*Assistant Examiner* — Vincent Peren
(74) *Attorney, Agent, or Firm* — JCIPRNET

(57) ABSTRACT

A model simplification method is provided. The model simplification method includes: constructing a surrounding body to surround a model, wherein the model includes at least one primitive and a plurality of vertexes; drawing the model and the surrounding body to at least one rendering surface by respectively taking each of the plurality of vertexes as an eye-position; determining whether the surrounding body drawn on the rendering surface by taking a current vertex of the plurality of vertexes as the eye-position is occluded to decide whether to mark the current vertex as an invisible vertex; and eliminating a current primitive from the model when all vertexes of the current primitive of the at least one primitive are marked as the invisible vertex.

9 Claims, 6 Drawing Sheets

(56) References Cited

OTHER PUBLICATIONS

Kanai, Satoshi, et al. "Appearance preserving simplification of 3D CAD model with large-scale assembly structures." International Journal on Interactive Design and Manufacturing (IJIDeM) 6.3 (2012): 139-154. (Year: 2012).*
Kwak, Jong-Geun, Sang C. Park, and Minho Chang. "Geometric data simplification for a virtual factory." The International Journal of Advanced Manufacturing Technology 50.1-4 (2010): 409-418. (Year: 2010).*
Qiu, Z. M., et al. "Geometric model simplification for distributed CAD." Computer-Aided Design 36.9 (2004): 809-819. (Year: 2004).*
Germs, Rick, and Frederik W. Jansen. "Geometric simplification for efficient occlusion culling in urban scenes." (2001). (Year: 2001).*
Nooruddin, Fakir S., and Greg Turk. "Interior/exterior classification of polygonal models." Proceedings Visualization 2000. VIS 2000 (Cat. No. 00CH37145). IEEE, 2000. (Year: 2000).*

\* cited by examiner

MODEL SIMPLIFICATION METHOD

CROSS-REFERENCE TO RELATED APPLICATION

This application claims the priority benefit of China application no. 202010855118.8, filed on Aug. 24, 2020. The entirety of the above-mentioned patent application is hereby incorporated by reference herein and made a part of this specification.

BACKGROUND

Technical Field

The invention relates to a model simplification method.

Description of Related Art

A general modeling tool is to model every part of an object, including invisible primitives and vertexes inside a model. When the model is used for rendering drawing, such as in a 3D game scene, in a 3D application, or in a 3D movie rendering drawing, a viewing angle is restricted and limited. Generally, regarding a rendering image, it is unnecessary to see the parts inside the model. However, since the parts inside the model (such as the invisible primitives and the invisible vertexes inside the model) are unnecessary to be seen during drawing, if these parts also participate in the drawing, it causes waste of rendering time and resources. How to simplify the model to increase drawing efficiency is an urgent issue to be solved.

SUMMARY

The invention is directed to a model simplification method, which is adapted to eliminate invisible primitives from a model.

The invention provides a model simplification method including the following steps. A surrounding body is constructed to surround a model. The model includes at least one primitive and a plurality of vertexes. The model and the surrounding body are drawn to at least one rendering surface by taking each of the plurality of vertexes as an eye-position respectively. Whether the surrounding body drawn on the rendering surface by taking a current vertex in the plurality of vertexes as the eye-position is occluded is determined to decide whether to mark the current vertex as an invisible vertex. A current primitive is eliminated from the model when all vertexes of the current primitive of the at least one primitive are marked as the invisible vertex.

Based on the above description, the model simplification method of the invention may draw the surrounding body to the rendering surface from the current vertex to determine whether the surrounding body is occluded, so as to determine whether to mark the current vertex as the invisible vertex. After completing the check operation of "invisible vertex" on the plurality of vertexes of the model, when all of the vertexes of the current primitive are marked as the invisible vertex, the current primitive may be eliminated from the model, and the model may be effectively simplified.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

According to different design requirements, the model simplification method described in the following embodiments may be implemented in hardware, firmware, software, or combinations thereof.

In terms of hardware, the model simplification method may be implemented by a logic circuit on an integrated circuit. Related operations/functions of the model simplification method may be implemented as hardware by using hardware description languages (for example, Verilog HDL or VHDL) or other suitable programming languages. For example, the related operations/functions of the model simplification method may be implemented in one or a plurality of controllers, microcontrollers, microprocessors, application-specific integrated circuits (ASICs), digital signal processors (DSPs), field programmable gate arrays (FPGAs), and/or various logic blocks, modules and circuits in other processing units.

In terms of software and/or firmware, the related operations/functions of the model simplification method may be implemented as programming codes. For example, general programming languages (such as C, C++ or an assembly language) or other suitable programming languages are used to implement the related operations/functions of the model simplification method. The programming codes may be recorded/stored in a recording medium. In some embodiments, the recording medium, for example, includes a read only memory (ROM), a random access memory (RAM), and/or a storage device. The storage device includes a hard disk drive (HDD), a solid-state drive (SSD) or other storage devices. In some other embodiments, the recording medium may include a "non-transitory computer readable medium". For example, a tape, a disk, a card, a semiconductor memory, a programmable logic circuit, etc., may be used to implement the non-transitory computer readable medium. A computer, a central processing unit (CPU), a controller, a microcontroller, or a microprocessor may read the programming codes from the recording medium and execute the same to implement the related operations/functions of the model simplification method. Moreover, the programming codes may also be provided to the computer (or CPU) via any transmission medium (a communication network or a broadcast radio wave, etc.). The communication network is, for example, the Internet, a wired communication network, a wireless communication network, or other communication media.

Generally, one model includes at least one primitive and a plurality of vertexes. When the model is used for rendering drawing, one or a plurality of primitives of the model may be invisible. The invisible primitive means that although one primitive participates in a rendering drawing process, it is not appeared in a rendering result (a drawn model image) due to occlusion. Therefore, the invisible primitives may waste a rendering time and resources.

Figure 1:
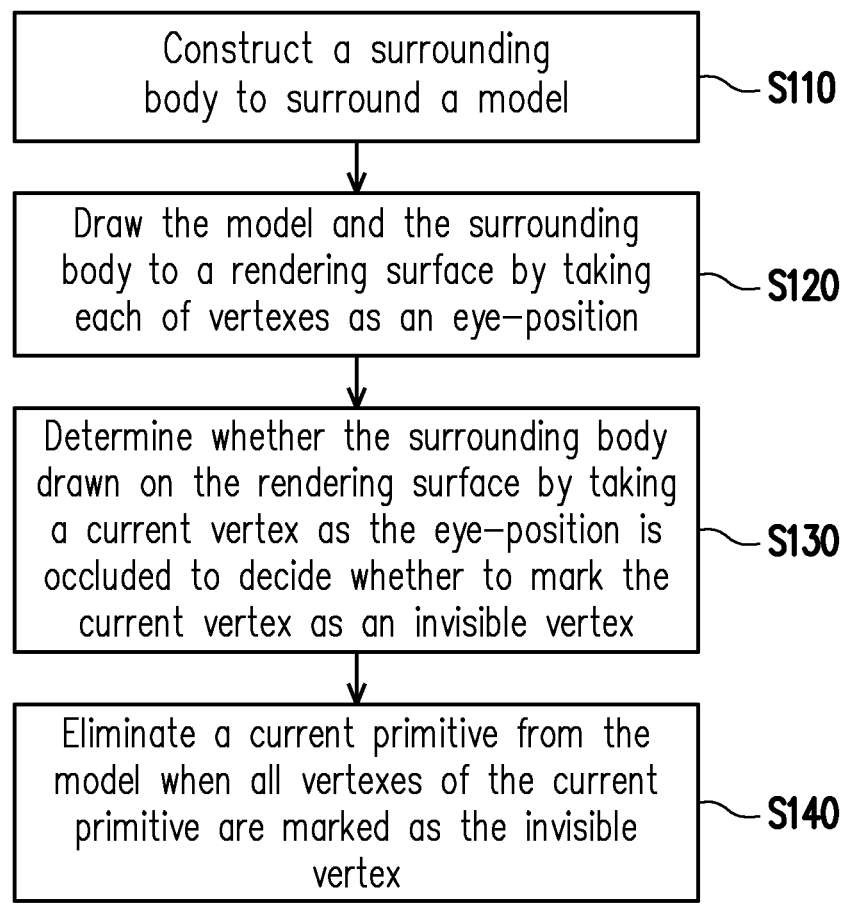
FIG. 1 is a schematic flowchart illustrating a model simplification method according to an embodiment of the invention.

FIG. 1 is a schematic flowchart illustrating a model simplification method according to an embodiment of the invention. The method shown in FIG. 1 may be used to perform a simplification operation on the model to remove invisible primitives from the model. In step S110 of FIG. 1, a surrounding body is constructed to surround the model. The surrounding body may be set according to a design requirement.

Figure 2:
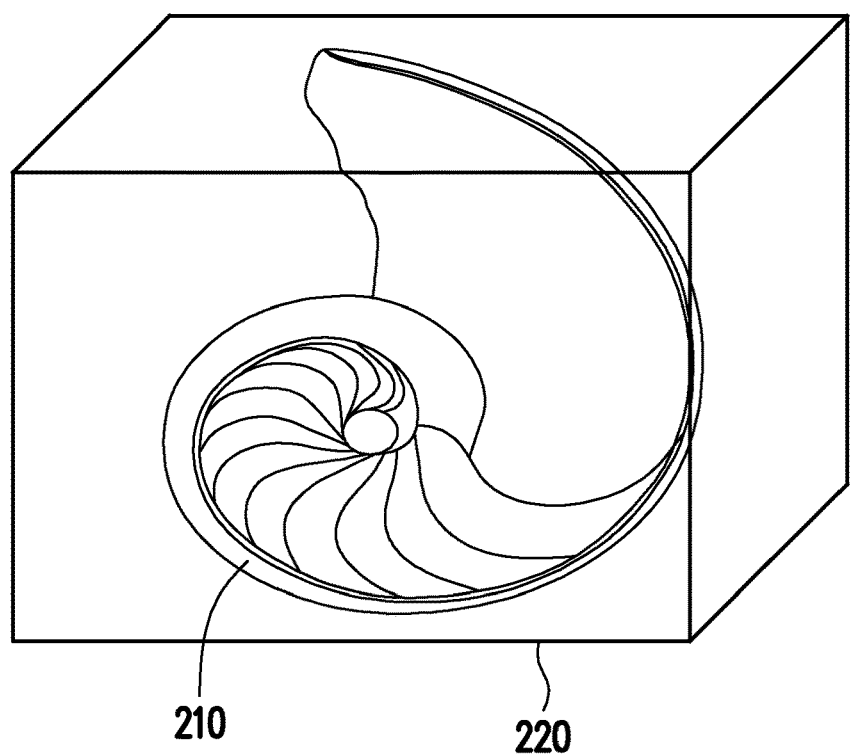
FIG. 2 is a schematic diagram of a surrounding body according to an embodiment of the invention.

For example, FIG. 2 is a schematic diagram of a model and a surrounding body according to an embodiment of the invention. A model 210 shown in FIG. 2 may be any three-dimensional model (3D model) to be simplified. In the embodiment, the model 210 may include at least one primitive and a plurality of vertexes. For example, the primitive may be a triangle, a line, or other geometric shapes. The primitive may include a plurality of vertexes. For example, a triangle primitive may include three vertexes, and a line primitive may include two vertexes. Types of the model, the primitive and the vertex are not limited by the invention. The model simplification method of the embodiment may be applied to any model. Referring to FIG. 1 and FIG. 2, in step S110, a surrounding body 220 is constructed to completely surround the model 210. The surrounding body 220 shown in FIG. 2 is a hexahedron. In any case, the implementation of the surrounding body of the invention should not be limited to the surrounding body 220 shown in FIG. 2.

Figure 3:
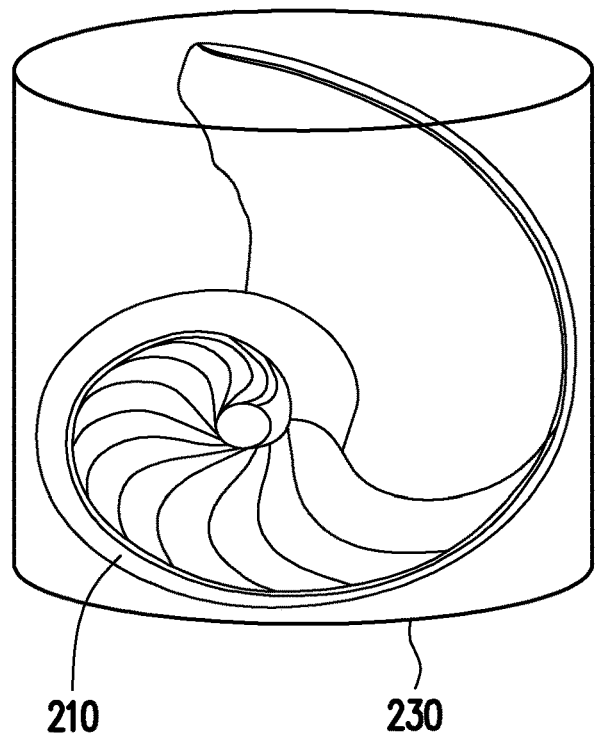
FIG. 3 is a schematic diagram of a surrounding body according to another embodiment of the invention.

For example, FIG. 3 is a schematic diagram of a surrounding body according to another embodiment of the invention. For the model 210 shown in FIG. 3, reference may be made to the related description of the model 210 shown in FIG. 2, so that detail thereof is not repeated. Referring to FIG. 1 and FIG. 3, in step S110, a surrounding body 230 may be constructed to surround the model 210. The surrounding body 230 shown in FIG. 3 is a cylinder. In other embodiments, a geometric shape of the surrounding body used to surround the model 210 may include a triangular cylinder, a cube, a cuboid, a tetrahedron, a rhombic cylinder, a pyramid, a cone, a cylinder, or other geometric shapes.

A construction method of the surrounding body 220 (or 230) will be described in the embodiment of FIG. 4 or FIG. 5. In any case, the construction method of the surrounding body of the invention should not be limited to the embodiment shown in FIG. 4 or FIG. 5. In other embodiments, the construction method of the surrounding body may be determined according to a design requirement.

Figure 4:
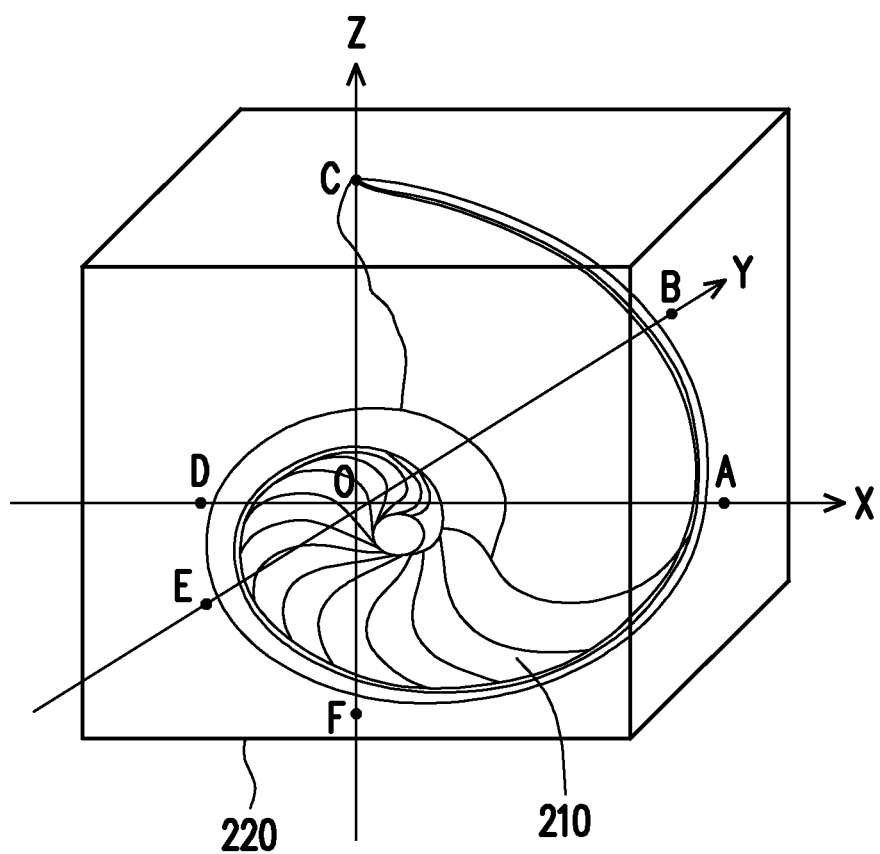
FIG. 4 is a schematic diagram illustrating a construction method of a surrounding body according to an embodiment of the invention.

FIG. 4 is a schematic diagram illustrating a construction method of the surrounding body 220 according to an embodiment of the invention. Referring to FIG. 1 and FIG. 4, in step S110, the surrounding body 220 may be constructed to surround the model 210. In the embodiment, step S110 (the operation of constructing the surrounding body 220) may include: calculating an equation 1, an equation 2, an equation 3, an equation 4, an equation 5, and an equation 6 to obtain boundary coordinates Ax, By, Cz, Dx, Ey, and Fz, and constructing the surrounding body 220 according to the boundary coordinates Ax, By, Cz, Dx, Ey, and Fz. The boundary coordinates Ax and Dx may be X-axis coordinates of a point A and a point D on an X-axis shown in FIG. 4. The boundary coordinates By and Ey may be Y-axis coordinates of a point B and a point E on a Y-axis shown in FIG. 4. The boundary coordinates Cz and Fz may be Z-axis coordinates of a point C and a point F on a Z-axis shown in FIG. 4. The points A, B, C, D, E, and F shown in FIG. 4 may define six surfaces of the surrounding body 220. Where, $x_{v1}, x_{v2} \ldots x_{vn}$ represent X-axis coordinates of a plurality of vertexes of the model 210, $y_{v1}, y_{v2} \ldots y_{vn}$ represent Y-axis coordinates of the plurality of vertexes of the model 210, and $z_{v1}, z_{v2} \ldots z_{vn}$ represent Z-axis coordinates of the plurality of vertexes of the model 210, and $\delta_A, \delta_B, \delta_C, \delta_D, \delta_E,$ and $\delta_F$ represent six real numbers greater than or equal to 0. Each of the real numbers $\delta_A, \delta_B, \delta_C, \delta_D, \delta_E,$ and $\delta_F$ may be determined according to a design requirement.

$$Ax = \max(x_{v1}, x_{v2} \ldots x_{vn}) + \delta_A \quad \text{equation 1}$$

$$By = \max(y_{v1}, y_{v2} \ldots y_{vn}) + \delta_B \quad \text{equation 2}$$

$$Cz = \max(z_{v1}, z_{v2} \ldots z_{vn}) + \delta_C \quad \text{equation 3}$$

$$Dx = \min(x_{v1}, x_{v2} \ldots x_{vn}) - \delta_D \quad \text{equation 4}$$

$$Ey = \min(y_{v1}, y_{v2} \ldots y_{vn}) - \delta_E \quad \text{equation 5}$$

$$Fz = \min(z_{v1}, z_{v2} \ldots z_{vn}) - \delta_F \quad \text{equation 6}$$

Where, n is a total number of the vertexes of the model 210, $\delta_A, \delta_B,$ and $\delta_C$ are respectively offsets increased in positive directions of the X-axis, the Y-axis, and the Z-axis, and $\delta_D, \delta_E,$ and $\delta_F$ are respectively offsets decreased in negative directions of the X-axis, the Y-axis, and the Z-axis. In the embodiment of FIG. 4, the operation of constructing the surrounding body 220 (step S110) may create the surrounding body 220 in a model space of the model 210. Namely, the points A, B, C, D, E, and F of the surrounding body 220 may use the same coordinate system space as the model 210.

After the boundary coordinates Ax, By, Cz, Dx, Ey, and Fz are calculated, in step S110, the cuboid surrounding body 220 may be constructed according to the boundary coordinates Ax, By, Cz, Dx, Ey, and Fz. For example, the boundary coordinates Ax and Dx may determine two orthogonal planes of the X-axis (an orthogonal plane of the point A and an orthogonal plane of the point D), the boundary coordinates By and Ey may determine two orthogonal planes of the Y-axis (an orthogonal plane of the point B and an orthogonal plane of the point E), and the boundary coordinates Cz and Fz may determine two orthogonal planes of the Z-axis (an orthogonal plane of the point C and an orthogonal plane of the point F). Namely, the operation of constructing the surrounding body 220 in the embodiment of FIG. 4 may directly construct the surrounding body 220 according to the model space of the model 210 without the need to perform coordinate space conversion.

Figure 5:
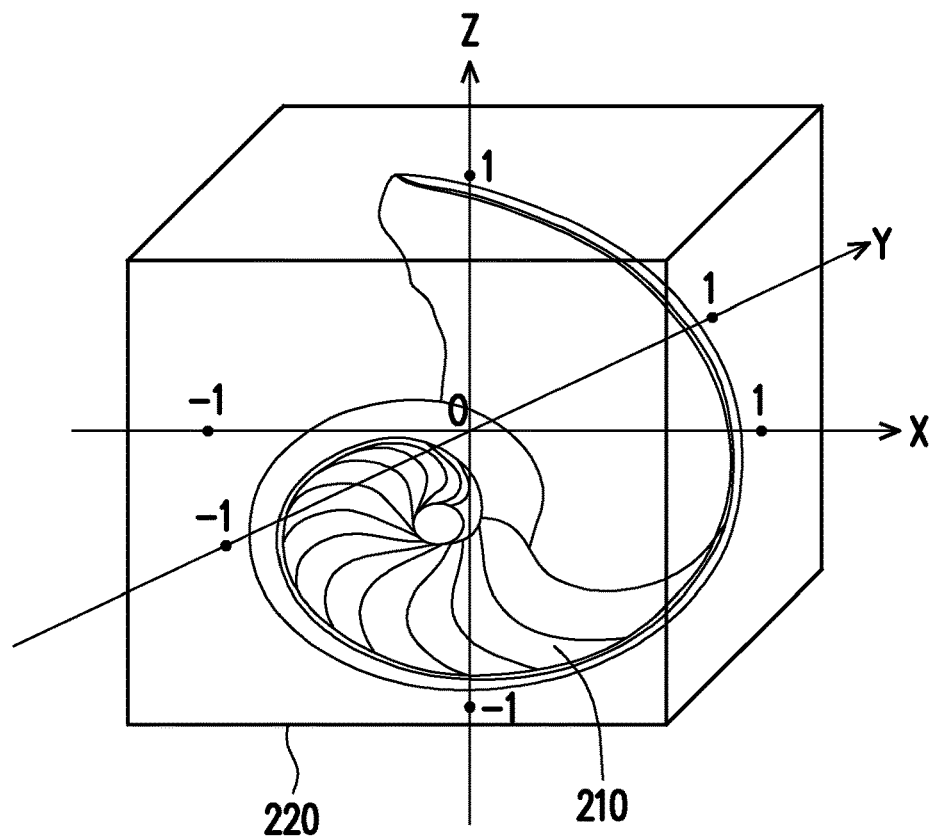
FIG. 5 is a schematic diagram illustrating a construction method of a surrounding body according to another embodiment of the invention.

FIG. 5 is a schematic diagram illustrating a construction method of the surrounding body 220 according to another embodiment of the invention. Referring to FIG. 1 and FIG.

5, in step S110, the surrounding body 220 may be constructed to surround the model 210. In the embodiment, step S110 (the operation of constructing the surrounding body 220) may include: calculating an equation 7, an equation 8, and an equation 9 to obtain X-axis coordinate difference value $x_d$, Y-axis coordinate difference value $y_d$ and Z-axis coordinate difference value $z_d$, and calculating an equation 10 to obtain a scaling factor $f_d$. Where, $x_{v1}$, $x_{v2}$ ... $x_{vn}$ represent X-axis coordinates of the plurality of vertexes of the model 210 in a model coordinate space, $y_{v1}$, $y_{v2}$ ... $y_{vn}$ represent Y-axis coordinates of the plurality of vertexes of the model 210 in the model coordinate space, and $z_{v1}$, $z_{v2}$ ... $z_{vn}$ represent Z-axis coordinates of the plurality of vertexes of the model 210 in the model coordinate space.

$$x_d = \max(x_{v1}, x_{v2} \ldots x_{vn}) - \min(x_{v1}, x_{v2} \ldots x_{vn}) \quad \text{equation 7}$$

$$y_d = \max(y_{v1}, y_{v2} \ldots y_{vn}) - \min(y_{v1}, y_{v2} \ldots y_{vn}) \quad \text{equation 8}$$

$$z_d = \max(z_{v1}, z_{v2} \ldots z_{vn}) - \min(z_{v1}, z_{v2} \ldots z_{vn}) \quad \text{equation 9}$$

$$f_d = \max(x_d, y_d, z_d)/2 \quad \text{equation 10}$$

In step S110, the plurality of vertexes of the model 210 may be translated and transformed from the model coordinate space to a new coordinate space that takes a center of the model 210 (i.e., a point o shown in FIG. 5) as an origin. Then, in step S110, the scaling factor $f_d$ is used to calculate an equation 11, an equation 12, and an equation 13 to obtain a scaled X-axis coordinate xn, a scaled Y-axis coordinate yn, and a scaled Z-axis coordinate zn in the new coordinate space. Where, xs represents an original X-axis coordinate of any one of the vertexes of the model 210 in the new coordinate space, xn represents the scaled X-axis coordinate of any one of the vertexes of the model 210 in the new coordinate space, ys represents an original Y-axis coordinate of any one of the vertexes of the model 210 in the new coordinate space, yn represents the scaled Y-axis coordinate of any one of the vertexes of the model 210 in the new coordinate space, zs represents an original Z-axis coordinate of any one of the vertexes of the model 210 in the new coordinate space, and zn represents the scaled Z-axis coordinate of any one of the vertexes of the model 210 in the new coordinate space.

$$xn = xs/f_d \quad \text{equation 11}$$

$$yn = ys/f_d \quad \text{equation 12}$$

$$zn = zs/f_d \quad \text{equation 13}$$

Then, in step S110, an equation 14, an equation 15, an equation 16, an equation 17, an equation 18, and an equation 19 may be calculated to obtain the boundary coordinates Ax, By, Cz, Dx, Ey, and Fz. Finally, in step S110, the surrounding body 220 may be constructed according to the boundary coordinates Ax, By, Cz, Dx, Ey, and Fz. Where, $xn_1$, $xn_2$ ... $xn_n$ represent the scaled X-axis coordinates of the plurality of vertexes of the model 210 in the new coordinate space, $yn_1$, $yn_2$ ... $yn_n$ represent the scaled Y-axis coordinates of the plurality of vertexes of the model 210 in the new coordinate space, $zn_1$, $zn_2$ ... $zn_n$ represent the scaled Z-axis coordinates of the plurality of vertexes of the model 210 in the new coordinate space, and $\delta_A$, $\delta_B$, $\delta_C$, $\delta_D$, $\delta_E$, and $\delta_F$ represent six real numbers greater than or equal to 0. Each of the real numbers $\delta_A$, $\delta_B$, $\delta_C$, $\delta_D$, $\delta_E$, and $\delta_F$ may be determined according to a design requirement.

$$Ax = \max(xn_1, xn_2 \ldots xn_n) + \delta_A \quad \text{equation 14}$$

$$By = \max(yn_1, yn_2 \ldots yn_n) + \delta_B \quad \text{equation 15}$$

$$Cz = \max(zn_1, zn_2 \ldots zn_n) + \delta_C \quad \text{equation 16}$$

$$Dx = \min(xn_1, xn_2 \ldots xn_n) - \delta_D \quad \text{equation 17}$$

$$Ey = \min(yn_1, yn_2 \ldots yn_n) - \delta_E \quad \text{equation 18}$$

$$Fz = \min(zn_1, zn_2 \ldots zn_n) - \delta_F \quad \text{equation 19}$$

Where, n is a total number of the vertexes of the model 210. Namely, the operation of constructing the surrounding body 220 adopted in the embodiment of FIG. 5 may translate and transform the plurality of vertexes of the model 210 from the model space to the new coordinate space that takes the center of the model 210 (i.e., the point o in FIG. 5) as the origin, and then construct the surrounding body 220 in the new coordinate space. In another embodiment, the operation of step S110 may also select other arbitrary position (the position is determined according to the design requirement) as the origin of the new coordinate space, and translate and transform the plurality of vertexes of the model 210 from the model space to the new coordinate space. The method of selecting the origin of the new coordinate space is not limited by the invention.

After translating and transforming the plurality of vertexes of the model 210 to the new coordinate space, in step S110, the scaling factor $f_d$ may be used to scale the model 210 in the new coordinate space. Through the operations of translation, transformation and scaling, the surrounding body 220 may be constructed relatively easily in step S110.

Referring to FIG. 1, in step S120, each of the plurality of vertexes of the model 210 is taken as an eye-position to draw the model and the surrounding body to at least one rendering surface. In step S130, it is determined whether the surrounding body drawn on the rendering surface by taking a current vertex in the plurality of vertexes as the eye-position is occluded to decide whether to mark the current vertex as an invisible vertex.

Figure 6:
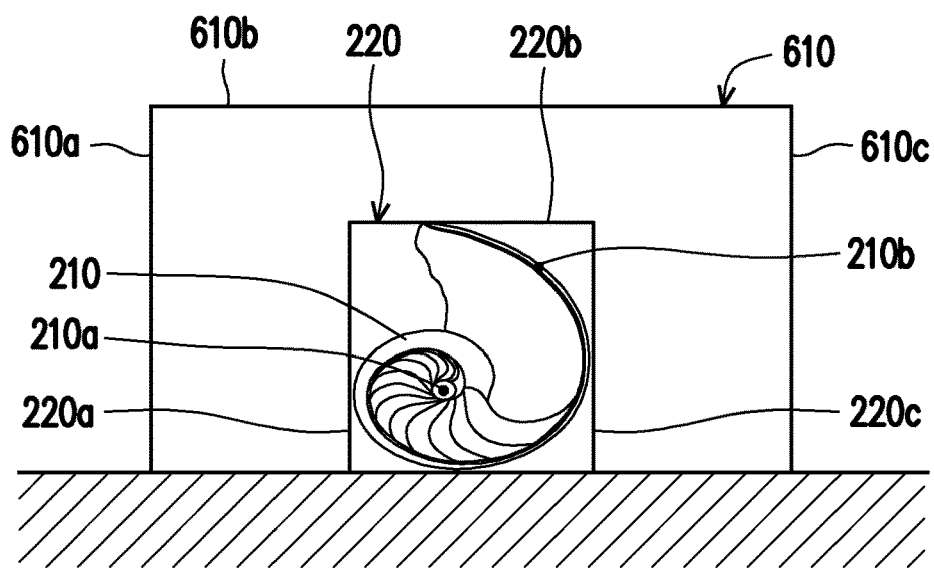
FIG. 6 is a cross-sectional schematic view of a model, a surrounding body, and a rendering surface according to an embodiment of the invention.

FIG. 6 is a cross-sectional schematic view of the model 210, the surrounding body 220, and a rendering surface 610 according to an embodiment of the invention. For the model 210 and the surrounding body 220 shown in FIG. 6, reference may be made to the related descriptions of the model 210 and the surrounding body 220 shown FIG. 2, the model 210 and the surrounding body 230 shown in FIG. 3, the model 210 and the surrounding body 220 shown in FIG. 4, and/or the model 210 and the surrounding body 220 shown in FIG. 5, and details thereof are not repeated. The model 210 shown in FIG. 6 includes a vertex 210a and a vertex 210b. The vertex 210a is located inside the model 210, and the vertex 210b is located on an outer surface of the model 210. When the model 210 is viewed from any eye-position outside the model 210, the vertex 210a is invisible and the vertex 210b is visible. Therefore, the vertex 210a may be referred to as an invisible vertex.

In the situation shown in FIG. 6, the model 210 is placed on the ground, so that rendering drawing of the model 210 toward a ground direction is unnecessary. Based on such situation, the surrounding body 220 may be composed of five surrounding surfaces. FIG. 6 is a cross-sectional schematic diagram, so that three of the surrounding surfaces 220a, 220b, and 220c of the surrounding body 220 are illustrated in FIG. 6. Deduced by analogy, FIG. 6 illustrates three rendering planes (rendering targets) 610a, 610b and 610c of the rendering surface 610. As shown in FIG. 6, the rendering surface 610 may surround the model 210 and the surrounding body 220.

Referring to FIG. 1 to FIG. 6, in steps S120 and S130, a check operation of "invisible vertex" may be performed on the vertex 210*b* of the model 210. For example, in step S120, the vertex 210*b* of the model 210 may be taken as the eye-position to respectively draw the model 210 to the rendering planes 610*a*, 610*b*, and 610*c* of the rendering surface 610, and then respectively draw the surrounding surfaces 220*a*, 220*b* and 220*c* of the surrounding body 220 to the rendering planes 610*a*, 610*b*, and 610*c*. The surrounding surface 220*c* (the surrounding body 220) drawn to the rendering plane 610*c* by taking the vertex 210*b* as the eye-position is not occluded, so that in step S130, it is determined that the vertex 210*b* is a visible vertex.

In steps S120 and S130, the check operation of "invisible vertex" may be performed on the vertex 210*a* of the model 210. For example, in step S120, the vertex 210*a* of the model 210 may be taken as the eye-position to respectively draw the model 210 to the rendering planes 610*a*, 610*b*, and 610*c* of the rendering surface 610, and then respectively draw the surrounding surfaces 220*a*, 220*b* and 220*c* of the surrounding body 220 to the rendering planes 610*a*, 610*b*, and 610*c*. In the rendering plane 610*a* drawn by taking the vertex 210*a* as the eye-position, the surrounding surface 220*a* (the surrounding body 220) is completely occluded by the model 210. In the rendering plane 610*b* drawn by taking the vertex 210*a* as the eye-position, the surrounding surface 220*b* (the surrounding body 220) is completely occluded by the model 210. In the rendering plane 610*c* drawn by taking the vertex 210*a* as the eye-position, the surrounding surface 220*c* (the surrounding body 220) is completely occluded by the model 210. Therefore, in step S130, it may be determined whether the surrounding body 220 drawn to the rendering surface 610 by taking the current vertex of the plurality of vertexes as the eye-position is completely occluded. When the surrounding body 220 drawn to the rendering surface 610 by taking the vertex 210*a* as the eye-position is completely occluded, in step S130, it is determined that the vertex 210*a* is an invisible vertex, and the vertex 210*a* is marked as the "invisible vertex".

Deduced by analogy, in step S130, the above check operation of "invisible vertex" may be performed on each of the vertexes of the model 210. Therefore, the model simplification method may draw the surrounding body from the current vertex to the rendering surface and determine whether the surrounding body is occluded, so as to determine whether to mark the current vertex as an invisible vertex. Referring to FIG. 1, in the case that all of the vertexes of a current primitive in at least one primitive are marked as the invisible vertex, in step S140, the current primitive may be eliminated from the model 120. In this way, the model 210 may be effectively simplified.

Figure 7:
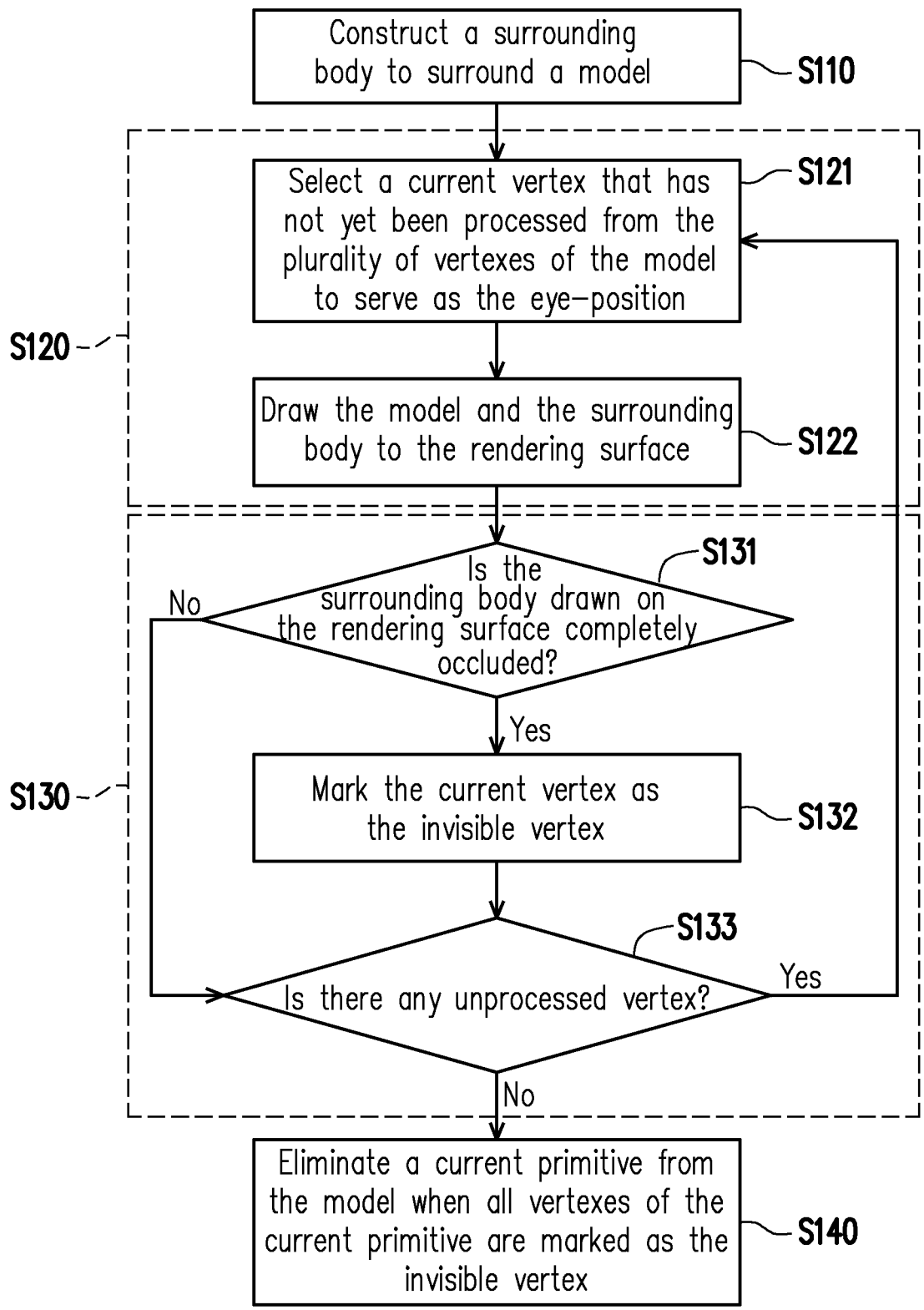
FIG. 7 is a schematic diagram of a detailed flow of the model simplification method shown in FIG. 1 according to an embodiment of the invention.

FIG. 7 is a schematic diagram of a detailed flow of the model simplification method shown in FIG. 1 according to an embodiment of the invention. For steps S110, S120, S130, and S140 shown in FIG. 7, reference may be made to related descriptions of steps S110, S120, S130, and S140 shown in FIG. 1. In the embodiment shown in FIG. 7, step S120 includes steps S121 and S122, and step S130 includes steps S131, S132, and S133.

Referring to FIG. 6 and FIG. 7, in step S121, a vertex that has not yet been processed may be selected from the plurality of vertexes of the model 210 to serve as the eye-position. The above "processed" refers to the check operation of "invisible vertex" of steps S121, S122, S131, S132, and S133. The vertex selected in step S121 is referred to as the "current vertex". In step S122, the current vertex may be taken as the eye-position to draw the model 210 and the surrounding body 220 to the rendering surface 610. In step S131, occlusion query/check is performed, i.e., it is determined whether the surrounding body 220 drawn to the rendering surface 610 is completely occluded by the model 210. When the surrounding body 220 drawn to the rendering surface 610 is not completely occluded (a determination result of step S131 is "No"), step S132 is skipped and step S133 is executed directly.

When the surrounding body 220 drawn to the rendering surface 610 is completely occluded (the determination result of step S131 is "Yes"), step S132 is executed. In step S132, the current vertex is marked as the "invisible vertex". In step S133, it is checked/determined whether there are unprocessed vertexes in the vertexes of the model 210. When the model 210 still has the unprocessed vertexes (a determination result of step S133 is "Yes"), steps S121, S122, and S131 are executed again.

When all of the vertexes of the model 210 have been processed (the determination result of step S133 is "No"), step S140 is executed. For example, when all of the vertexes of the current primitive are marked as the "invisible vertex", in step S140, it is determined that the current primitive is an invisible primitive. When the current primitive is determined as the invisible primitive, in step S140, the current primitive may be eliminated from the model 210. Moreover, in step S140, all of the vertexes of the model 210 may be checked. If one of the vertexes of the model 210 is not used by any primitive, such vertex may be referred to as an "unused vertex". Since the "unused vertex" is not used by any primitive, in step S140, the unused vertex may be deleted from the model 210.

Figure 8:
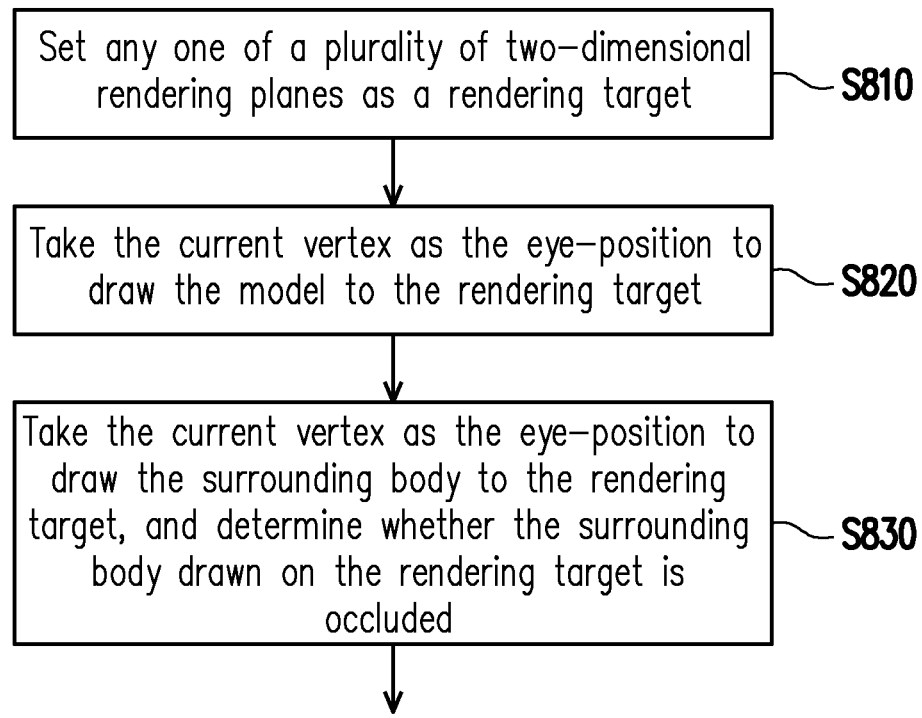
FIG. 8 is a schematic diagram of a detailed flow of an operation of "drawing a model and a surrounding body to a rendering surface" shown in FIG. 6 according to an embodiment of the invention.

FIG. 8 is a schematic diagram of a detailed flow of the operation of "drawing the model and the surrounding body to the rendering surface" shown in FIG. 6 according to an embodiment of the invention. Referring to FIG. 6 and FIG. 8, step S122 includes steps S810, S820, and S830. In step S810, any one of a plurality of two-dimensional (2D) rendering planes of the surrounding body 220 may be set as a rendering target. In step S820, the current vertex selected in step S121 may be taken as the eye-position to draw the model 210 to the rendering target. In step S830, the current vertex selected in step S121 may be taken as the eye-position to draw the surrounding body 220 to the rendering target, and it is determined whether the surrounding body 220 drawn on the rendering target is occluded. When the surrounding body 220 drawn on the 2D rendering planes (the rendering targets) is completely occluded (the determination result of step S131 is "Yes"), in step S132, the current vertex is marked as the "invisible vertex".

To be specific, it is assumed that the surrounding body 220 includes six 2D rendering planes p1 to p6 that are orthogonal to each other. In step S810, one 2D rendering plane (for example, the 2D rendering plane p1) may be selected from the 2D rendering planes p1-p6 to serve as a current rendering target. Then, in step S820, the current vertex selected in step S121 may be taken as the eye-position to draw the model 210 to the current rendering target. In step S830, the current vertex selected in step S121 may be taken as the eye-position to draw the surrounding body 220 to the current rendering target, and it is determined whether the surrounding body 220 drawn on the current rendering target (i.e., the 2D rendering plane p1) is completely occluded. Steps S810-S830 may be executed again to select a next 2D rendering plane (for example, the 2D rendering plane p2) from the 2D rendering planes p1-p6 to serve as the current rendering target, and then draw the model 210 and the surrounding body 220 to the current rendering target, and determine whether the surrounding body 220 drawn on the current rendering target (i.e., the 2D rendering plane p2) is completely occluded. Deduced by analogy, steps S810-S830 may be executed for multiple times to draw the model 210 and the surrounding body 220 to the remained 2D rendering planes p3-p6 respectively, and determine whether the surrounding body 220 drawn on the 2D rendering planes p3-p6 is completely occluded. When the surrounding body 220 drawn on the 2D rendering planes p1-p6 is completely occluded, the current vertex selected in step S121 may be marked as the "invisible vertex".

In an embodiment, the model 210 and the surrounding body 220 may be drawn on all the 2D rendering planes every time to determine whether the drawn surrounding body 220 is completely occluded. In another embodiment, when the surrounding body 220 drawn on one of the 2D planes is determined as not being occluded, the current vertex selected in step S121 is determined as a visible vertex, and the model 210 and the surrounding body 220 are not continued to be drawn on the remaining 2D rendering planes. For example, assuming that the surrounding body 220 drawn on the 2D rendering plane p2 is determined as not being occluded, the current vertex is determined as a visible vertex, and there is no need to continue to draw the model 210 and the surrounding body 220 on the remaining 2D rendering planes p3-p6.

Figure 9:
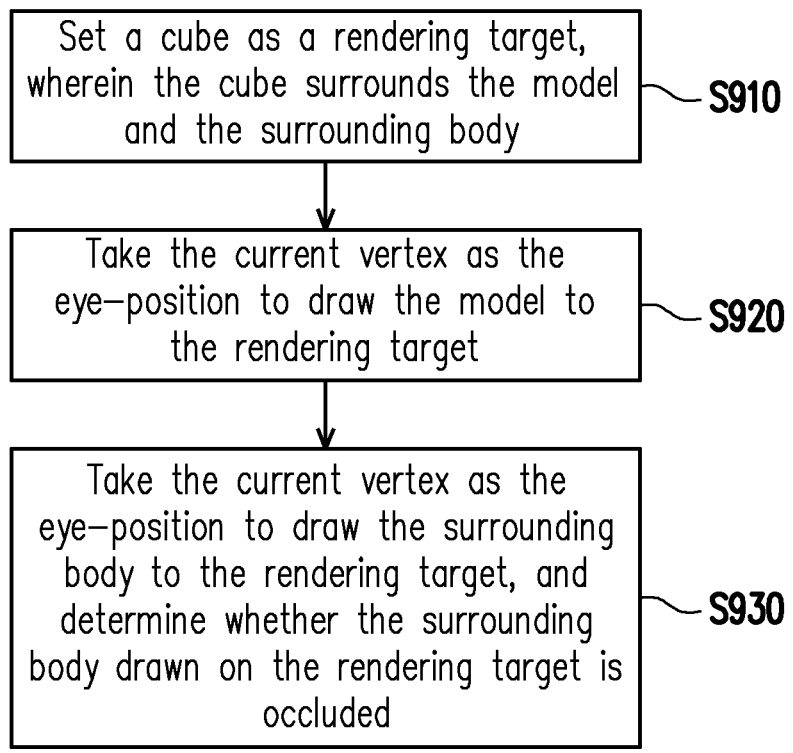
FIG. 9 is a schematic diagram of a detailed flow of an operation of "drawing a model and a surrounding body to a rendering surface" shown in FIG. 6 according to another embodiment of the invention.

FIG. 9 is a schematic diagram of a detailed flow of the operation of "drawing the model and the surrounding body to the rendering surface" shown in FIG. 6 according to another embodiment of the invention. In the embodiment of FIG. 9, the surrounding body 220 may be a cube. Referring to FIG. 6 and FIG. 9, step S122 includes steps S910, S920, and S930. In step S910, a cube may be set as a rendering target, where the cube surrounds the model 210 and the surrounding body 220. In step S920, the current vertex selected in step S121 may be taken as the eye-position to draw the model 220 to the rendering target. In step S930, the current vertex selected in step S121 may be taken as the eye-position to draw the surrounding body 220 to the rendering target, and it is determined whether the surrounding body 220 drawn on the rendering target is occluded. When the surrounding body 220 drawn on the rendering target (the cube) is completely occluded (the determination result of step S131 is "Yes"), in step S132, the current vertex may be marked as the "invisible vertex".

In summary, the model simplification method of the above embodiments may draw the surrounding body 220 from the current vertex to the rendering surface, and determine whether the surrounding body 220 (or 230) is occluded by the model 210, so as to determine whether to mark the current vertex as an "invisible vertex". After the check operations of "invisible vertex" on a plurality of the vertexes of the model 210 are completed, the model simplification method may check each of a plurality of the primitives of the model 210. In case that all of the vertexes of the current primitive are marked as the "invisible vertex", the current primitive may be determined as the "invisible primitive", and the model simplification method may eliminate the current primitive from the model 210. In addition, after the check operations of "invisible primitive" on a plurality of the primitives of the model 210 are completed, the model simplification method may also check all of the vertexes of the model 210. If one of the vertexes of the model 210 is not used by any primitive, such vertex may be referred to as an "unused vertex". The model simplification method may delete the unused vertex from the model 210, so that the model 120 may be further simplified.

What is claimed is:

1. A model simplification method, comprising:
   constructing a surrounding body to surround a model, wherein the model comprises at least one primitive and a plurality of vertexes;
   drawing the model and the surrounding body to at least one rendering surface by respectively taking each of the plurality of vertexes as an eye-position;
   taking a current vertex of the model as the eye-position with a viewing direction from the current vertex of the model toward the at least one rendering surface to determine whether the surrounding body drawn on the at least one rendering surface is occluded and marking the current vertex as an invisible vertex if the surrounding body drawn on the at least rendering surface is occluded;
   performing a vertex check operation to find out whether all vertexes of a current primitive included in the model are marked as invisible vertexes; and
   eliminating the current primitive from the model in response to determining that all vertexes of the current primitive included in the model are marked as invisible vertexes.

2. The model simplification method as claimed in claim 1, wherein the at least one rendering surface comprises a plurality of rendering planes, and the step of deciding whether to mark the current vertex as the invisible vertex comprises:
   marking the current vertex as the invisible vertex when the surrounding body drawn on the plurality of rendering planes by taking the current vertex as the eye-position is completely occluded.

3. The model simplification method as claimed in claim 1, further comprises:
   determining the current primitive as an invisible primitive when all vertexes of the current primitive are marked as the invisible vertexes; and
   deleting the current primitive from the model when the current primitive is determined as the invisible primitive.

4. The model simplification method as claimed in claim 1, further comprising:
   deleting an unused vertex from the model when the unused vertex of the plurality of vertexes is not used by any primitive.

5. The model simplification method as claimed in claim 1, wherein a geometric shape of the surrounding body comprises a triangular cylinder, a cube, a cuboid, a tetrahedron, a rhombic cylinder, a pyramid, a cone, or a cylinder.

6. The model simplification method as claimed in claim 1, wherein the step of constructing the surrounding body comprises:
   calculating $Ax=\max(x_{v1}, x_{v2} \ldots x_{vn})+\delta_A$, where $x_{v1}$, $x_{v2} \ldots x_{vn}$ represent X-axis coordinates of the plurality of vertexes, and $\delta_A$ represents a real number greater than or equal to 0;
   calculating $By=\max(y_{v1}, y_{v2} \ldots y_{vn})+\delta_B$, where $y_{v1}$, $y_{v2} \ldots y_{vn}$ represent Y-axis coordinates of the plurality of vertexes, and $\delta_B$ represents a real number greater than or equal to 0;
   calculating $Cz=\max(z_{v1}, z_{v2} \ldots z_{vn})+\delta_C$, where $z_{v1}$, $z_{v2} \ldots z_{vn}$ represent Z-axis coordinates of the plurality of vertexes, and $\delta_C$ represents a real number greater than or equal to 0;

calculating $Dx=\min(x_{v1}, x_{v2} \ldots x_{vn})-\delta_D$, where $\delta_D$ represents a real number greater than or equal to 0;

calculating $Ey=\min(y_{v1}, y_{v2} \ldots y_{vn})-\delta_E$, where $\delta_E$ represents a real number greater than or equal to 0;

calculating $Fz=\min(z_{v1}, z_{v2} \ldots z_{vn})-\delta_F$, where $\delta_F$ represents a real number greater than or equal to 0; and constructing the surrounding body according to Ax, By, Cz, Dx, Ey, and Fz, wherein Ax, By, Cz, Dx, Ey, and Fz are boundary coordinates of the surrounding body.

7. The model simplification method as claimed in claim 1, wherein the step of constructing the surrounding body comprises:

calculating X-axis coordinate difference value $x_d=\max(x_{v1}, x_{v2} \ldots x_{vn})-\min(x_{v1}, x_{v2} \ldots x_{vn})$, where $x_{v1}, x_{v2} \ldots x_{vn}$ represent X-axis coordinates of the plurality of vertexes in a model coordinate space;

calculating Y-axis coordinate difference value $y_d=\max(y_{v1}, y_{v2} \ldots y_{vn})-\min(y_{v1}, y_{v2} \ldots y_{vn})$, where $y_{v1}, y_{v2} \ldots y_{vn}$ represent Y-axis coordinates of the plurality of vertexes in the model coordinate space;

calculating Z-axis coordinate difference value $z_d=\max(z_{v1}, z_{v2} \ldots z_{vn})-\min(z_{v1}, z_{v2} \ldots z_{vn})$, where $z_{v1}, z_{v2} \ldots z_{vn}$ represent Z-axis coordinates of the plurality of vertexes in the model coordinate space;

calculating $f_d=\max(x_d, y_d, z_d)/2$, where $f_d$ is a scaling factor;

translating and transforming the plurality of vertexes of the model from the model coordinate space to a new coordinate space with a center of the model as an origin;

calculating $xn=xs/f_d$, $yn=ys/f_d$, and $zn=zs/f_d$, where xs represents an original X-axis coordinate of any one of the plurality of vertexes in the new coordinate space, xn represents a scaled X-axis coordinate of any one of the plurality of vertexes in the new coordinate space, ys represents an original Y-axis coordinate of any one of the plurality of vertexes in the new coordinate space, yn represents a scaled Y-axis coordinate of any one of the plurality of vertexes in the new coordinate space, zs represents an original Z-axis coordinate of any one of the plurality of vertexes in the new coordinate space, and zn represents a scaled Z-axis coordinate of any one of the plurality of vertexes in the new coordinate space;

calculating $Ax=\max(xn_1, xn_2 \ldots xn_n)+\delta_A$, where $xn_1, xn_2 \ldots xn_n$ represent the scaled X-axis coordinates of the plurality of vertexes in the new coordinate space, and $\delta_A$ represents a real number greater than or equal to 0;

calculating $By=\max(yn_1, yn_2 \ldots yn_n)+\delta_B$, where $yn_1, yn_2 \ldots yn_n$ represent the scaled Y-axis coordinates of the plurality of vertexes in the new coordinate space, and $\delta_B$ represents a real number greater than or equal to 0;

calculating $Cz=\max(zn_1, zn_2 \ldots zn_n)+\delta_C$, where $zn_1, zn_2 \ldots zn_n$ represent the scaled Z-axis coordinates of the plurality of vertexes in the new coordinate space, and $\delta_C$ represents a real number greater than or equal to 0;

calculating $Dx=\min(xn_1, xn_2 \ldots xn_n)-\delta_D$, where $\delta_D$ represents a real number greater than or equal to 0;

calculating $Ey=\min(yn_1, yn_2 \ldots yn_n)-\delta_E$, where $\delta_E$ represents a real number greater than or equal to 0;

calculating $Fz=\min(zn_1, zn_2 \ldots zn_n)-\delta_F$, where $\delta_F$ represents a real number greater than or equal to 0; and constructing the surrounding body according to Ax, By, Cz, Dx, Ey, and Fz, wherein Ax, By, Cz, Dx, Ey, and Fz are boundary coordinates of the surrounding body.

8. The model simplification method as claimed in claim 1, wherein the step of drawing the model and the surrounding body to the at least one rendering surface comprises:

setting any one of a plurality of two-dimensional rendering planes as a rendering target;

taking the current vertex as the eye-position to draw the model to the rendering target; and taking the current vertex as the eye-position to draw the surrounding body to the rendering target, and determining whether the surrounding body drawn on the rendering target is occluded;

wherein when the surrounding body drawn on one of the plurality of two-dimensional rendering planes is completely occluded, the current vertex is marked as the invisible vertex.

9. The model simplification method as claimed in claim 1, wherein the step of drawing the model and the surrounding body to the at least one rendering surface comprises:

setting a cube as a rendering target, wherein the cube surrounds the model and the surrounding body;

taking the current vertex as the eye-position to draw the model to the rendering target; and taking the current vertex as the eye-position to draw the surrounding body to the rendering target, and determining whether the surrounding body drawn on the rendering target is occluded;

wherein when the surrounding body drawn on the rendering target is completely occluded, the current vertex is marked as the invisible vertex.

* * * * *